Aug. 10, 1926.
J. K. WHITE
1,595,275
FISHING ROD
Filed Oct. 4, 1924
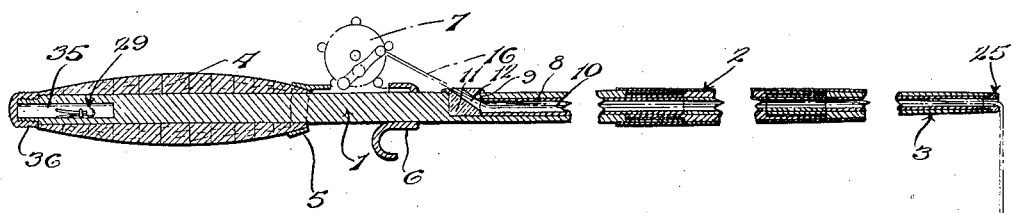
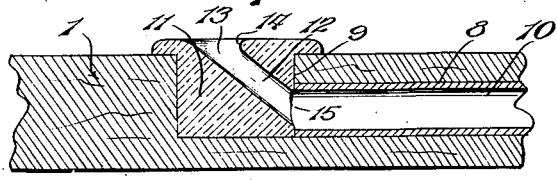
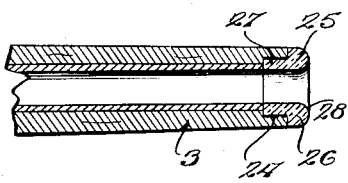
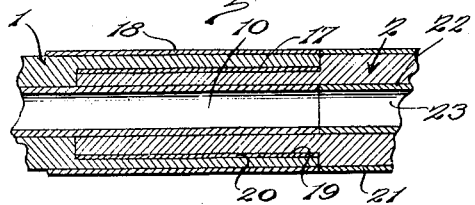
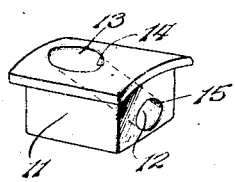
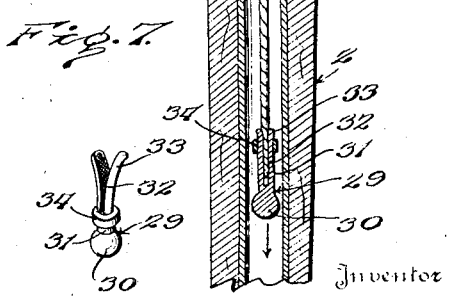
Inventor
J. K. White
By Lacey & Lacey, Attorneys Patented Aug. 10, 1926.

1,595,275

UNITED STATES PATENT OFFICE.

JOEL K. WHITE, OF LA CROSSE, WISCONSIN.

FISHING ROD.

Application filed October 4, 1924. Serial No. 741,627.

This invention relates to improvements in fishing rods.

The ordinary fishing rod is provided at intervals in the length of its several sections, with guides through which the line is passed and guided. Ordinarily such guides are secured to the sections of the rod by silk wrappings, and it is the experience of all fishermen that in time the threads of the wrapping will become broken or rotted and the guides will become loose or be completely lost, thereby necessitating re-wrapping of the guides or the provision of a new guide. Likewise, in stream fishing, where the fisherman is required to walk through brush, the guides as well as the portions of the line extending between the guides, are liable to become entangled thereby causing annoyance and sometimes necessitating cutting of the line. Furthermore, where the ordinary guides are employed, it is necessary, in assembling the several sections of the rod, to properly aline the guides by relative rotative adjustment of the sections as they are fitted one to another. Likewise, unless agate or similar guides are employed, the line is subject to wear as it passes rapidly through the guides, both in casting and in reeling up the line. In consideration of the foregoing, the present invention has as one of its objects to overcome the difficulties outlined by providing a structure of such character that the line may be led from the reel, axially through the rod and through the tip end of the tip section thereof, so that the portion of the line which extends through the rod is thoroughly protected from contact with the objects with which it might otherwise become entangled, and likewise, in casting and in reeling in the line, the line is guided throughout the entire length of its portion which passes through the rod instead of being merely guided at intervals in this portion of its length.

Another disadvantage presented by the ordinary fishing rod is that when the rod is made of steel, it is liable to break under severe strain, inasmuch, as to insure of the proper degree of flexibility, it must be relatively small in diameter, and therefore relatively weak. On the other hand, when the rod is made of bass wood or split bamboo, this same disadvantage is present, and
furthermore, the wood is subject to deteri-
oration if it becomes wet, and particularly in salt water fishing. Therefore, the present invention has for a further object to provide a rod which will possess the desired degree of flexibility or resiliency, and will at the same time possess greater strength and be capable of resisting greater stresses than either of the types of rods referred to.

Another object of the invention is to entirely dispense with the use of external guides upon the rod so that the rod, throughout its entire length, will be exteriorly smooth and will therefore present a more finished appearance than the ordinary rod.

In the accompanying drawings:—

Figure 1 is a vertical longitudinal sectional view through a fishing rod constructed in accordance with the present invention, the rod being broken away at intervals in its length;

Figure 2 is a detailed sectional view through a portion of the rod adjacent the reel seat;

Figure 3 is a similar view through the end of the tip section of the rod;

Figure 4 is a similar view through one of the joints for the sections;

Figure 5 is a similar view illustrating the manner in which the line may be led through the rod;

Figure 6 is a perspective view of the line guide which is associated with the rod adjacent the reel seat;

Figure 7 is a perspective view of the means provided for leading the line through the rod.

The rod embodying the invention may consist of any desired number of sections connected together in a manner to permit of their ready separation, as will be presently explained, but essentially the rod comprises a butt section indicated in general by the numeral 1, one or more intermediate sections indicated in general by the numeral 2, and a tip section indicated in general by the numeral 3. The section 1 of the rod is provided with the usual hand grip 4 which may be of cork, wood, or any other material usually employed for the purpose, and this section of the rod is preferably of wood. The numeral 5 indicates the fixed member of a reel seat, which member is secured upon the section 1 of the rod at the forward end of the hand grip 4, or at a point adjacent to this end of the hand grip, and the numeral 6 indicates the slidable member of the seat, which member is slidably mounted upon the said section of the rod. These parts need not differ from the ordinary corresponding parts of a reel seat and are adapted to mount the reel, indicated by the numeral 7, upon the said butt section of the rod.

As will be observed by reference to Figures 1, 2 and 4 of the drawings, the butt section 1 of the rod is formed axially with a bore indicated by the numeral 8, and this bore extends from the forward end of said section to a point, for example, in advance of the reel seat comprising the sections 5 and 6, at which point the section is formed with an opening 9 communicating with the inner end of the said bore. A length of steel tubing 10 is snugly fitted in to the bore 8, and, if desired, may be adhesively secured in place, and the said tubing extends from the said forward end of the section to the rear end of the bore. Fitted into the opening 9 is a cylindrical plug 11 of agate, glass, or any other similar material found suitable for the purpose which will now be explained, and this plug is formed with an obliquely extending bore 12 which opens through the forwardly presented side of the plug and communicates with the inner end of the tube 10, and at its upper end opens through the upper side of the plug as indicated by the numeral 13, the plug having its portion which surrounds the upper end of the said bore 12 rounded as indicated by the numeral 14 so that a line led through the bore 12 will contact only with rounded surfaces and will therefore not be subjected to wear. Likewise the forward end of the bore 12 is of slightly less diameter than the bore of the tube 10 and the wall of the bore is rounded at this point as indicated by the numeral 15, so that as the line enters the rear end of the tube 10 or leaves same, respectively in casting and in reeling in the line, it will contact only with rounded surfaces. The plug 11 is so arranged, of course, that the line led through its bore 12 will lead directly to the reel 7 as clearly shown in Figure 1 of the drawings, the said line being indicated by the numeral 16.

At the forward end of the butt section 1, the wood or other material of which the section is made, is interiorly increased in diameter at the corresponding end of the bore 8, as indicated by the numeral 17, and a ferrule 18 of metal is fitted to this end of the section, as is customary in all jointed fishing rods, the forward end of the ferrule terminating substantially at the forward end of the said section 1. Figure 4 of the drawings indicates one of the intermediate sections 2 assembled with the butt section 1, and it will be observed by reference to this figure that the section 2 is exteriorly reduced in diameter at its rear or inner end as indicated by the numeral 19, so that it may be fitted into the cylindrical recess formed between the enlargement 17 of the bore of the section 1 and the exterior surface of the forward end of the tube 10 within said bore. In order to reinforce the reduced portion of the intermediate section 2, and likewise to prevent contact of wood with wood, which might not be desirable, a ferrule or sleeve 20 of metal is fitted on to the reduced end of said section 2 and therefore snugly fits within the enlargement 17 of the bore of the section 1, when the sections of the rod are assembled. Also, if desired, a ferrule or sleeve 21, may be fitted onto the section 2, at its inner or rear end, to match with the ferrule 18 upon section 1. It will be observed by reference to Figure 4 that the intermediate section 2 is provided with an axial bore 22 and that a length of metal tubing 23 is fitted into this bore and matches with the tube 10, and this construction is followed throughout the several sections of the rod so that when the sections are assembled, there is, in effect, a continuous metal tube extending axially through the rod substantially from end to end thereof, through which tube the line 16 is led.

The tip section 3 of the rod has its bore enlarged at its forward extremity as at 24, and the outer end of the metal tube which extends through the section, terminates at the inner end of the enlargement as shown in Figure 3. The numeral 25 indicates a guide having an annular body 26 and a neck 27 which latter is fitted into the enlargement 24 and adhesively or otherwise permanently fixed therein. The body 26 of the guide is exteriorly rounded throughout its circumference as indicated by the numeral 28, that the line passing through the opening in the guide will contact only with rounded surfaces.

From the foregoing description of the invention, it will be understood that the line 16 is to be led from the reel 7 through the guide 11, the tube comprising the several sections, and out through the guide 25. It will be evident that the entire length of the portion of the line which extends through the rod is protected and yet is permitted to run free. It will also be evident that no portion of the line can come in contact with sharp edges which would be liable to wear or cut the line, and that the line is more directly guided than is the case where external guides are provided at intervals in the length of the rod.

In the manufacture of the rod, the wood bodies of the several sections may be initially solid and the bores therein may be produced by a boring operation, or the said bodies may be of split bamboo. Likewise, if found desirable, the tip section 3 of the rod may be formed wholly of metal.

In order that the line 16 may be readily led through the tubular bore of the rod, a leader such as shown in Figures 5 and 7 of the drawings may be employed, the leader being indicated in general by the numeral 29 and comprising a substantially spherical body 30 having a shank 31 which is split as at 32 to provide two gripping portions 33, a collar 34 being slidably fitted onto the shank as shown in the drawings. In employing the leader, one end of the line is disposed between the opposing flat surfaces of the gripping portions 33, these portions being somewhat spread apart to permit of ready introduction of the end of the line, after which the collar 34 is slid along the shank in the direction of the free end of said portion 33, so as to bring these portions together and into gripping engagement with the end of the line as shown in Figure 5. The leader may be then introduced into either the bore 12 of the guide 11, or into the bore of the guide 25, and, the rod being vertically disposed, permitted to pass by gravity through the bore of the rod, carrying with it the line connected thereto.

In order that the leader 29 may be conveniently carried with the fishing rod, the rear end of the body of the butt section 1 is formed with a recess or short bore 35 into which the said leader may be introduced as shown in Figure 1, and a cap 36 is removably fitted onto said end of the said body and normally closes the said bore.

Having thus described the invention, what I claim is:—

A fishing rod having an axial bore therein, a metallic line-guiding tube extending within and lining the said bore, a line guiding tip fitted into the tip end of the rod and having an opening registering with the corresponding end of the bore of the tube, and a guide consisting of a plug seated radially within the rod adjacent the other end of the tube and having a guiding bore therethrough communicating directly at its front end with the bore of the tube and opening at its rear end through the outer end of the plug.

In testimony whereof I affix my signature.

JOEL K. WHITE. [L. S.]